(12) United States Patent
Mutisya et al.

(10) Patent No.: US 8,943,220 B2
(45) Date of Patent: Jan. 27, 2015

(54) CONTINUOUS DEPLOYMENT OF APPLICATIONS

(75) Inventors: Hillary Mucheru Mutisya, Seattle, WA (US); Benjamin W. Goldsmith, Seattle, WA (US); Edward Griffin Sheppard, III, Mercer Island, WA (US); Yimin Wu, Bellevue, WA (US); Hubert Edward Hoover, Auburn, WA (US)

(73) Assignee: Microsoft Corporation, Redmond, WA (US)

( * ) Notice: Subject to any disclaimer, the term of this patent is extended or adjusted under 35 U.S.C. 154(b) by 75 days.

(21) Appl. No.: 13/197,772

(22) Filed: Aug. 4, 2011

(65) Prior Publication Data

US 2013/0036237 A1 Feb. 7, 2013

(51) Int. Cl.
*H04L 29/06* (2006.01)
*G06F 9/445* (2006.01)
*G06F 11/14* (2006.01)

(52) U.S. Cl.
CPC .............. *G06F 8/65* (2013.01); *G06F 11/1433* (2013.01)
USPC ........................................................ 709/238

(58) Field of Classification Search
USPC ........................................................ 709/238
See application file for complete search history.

(56) References Cited

U.S. PATENT DOCUMENTS

| | | | |
|---|---|---|---|
| 6,438,749 B1 * | 8/2002 | Chamberlain | 717/174 |
| 6,785,721 B1 | 8/2004 | Immerman et al. | |
| 6,980,521 B1 * | 12/2005 | Jarvis | 370/238 |
| 7,210,143 B2 | 4/2007 | Or et al. | |
| 7,630,877 B2 | 12/2009 | Brown et al. | |
| 7,657,887 B2 | 2/2010 | Kothandaraman et al. | |
| 7,757,226 B2 | 7/2010 | Srivastava et al. | |
| 7,840,961 B1 | 11/2010 | Weathersby | |
| 8,205,194 B2 | 6/2012 | Fries et al. | |
| 8,307,437 B2 | 11/2012 | Seves et al. | |
| 8,429,639 B2 | 4/2013 | Jirka | |
| 2003/0130985 A1 * | 7/2003 | Driesen et al. | 707/1 |
| 2004/0225952 A1 | 11/2004 | Brown et al. | |
| 2005/0251523 A1 | 11/2005 | Rajamani et al. | |
| 2005/0262503 A1 | 11/2005 | Kane et al. | |

(Continued)

OTHER PUBLICATIONS

Yeung, Andrew., "From Development to Production: Streamlining SharePoint Deployment with DocAve® Deployment Manager", Retrieved at <<http://www.avepoint.com/assets/pdf/sharepoint_whitepapers/DocAve_Deployment_Manager_Technical_White_Paper.pdf>>, Technical White Paper, Mar. 2009, pp. 22.

(Continued)

*Primary Examiner* — Jason K Gee
(74) *Attorney, Agent, or Firm* — Steve Crocker; Jim Ross; Micky Minhas

(57) ABSTRACT

Concepts and technologies are described herein for continuously deploying applications. In accordance with the concepts and technologies disclosed herein, a first host environment executes an application. An upgrade for the application is released by creating a backup of the application and content used by the application and restoring the backup at a second host environment. The application hosted by the second host environment is upgraded, traffic is routed to the second host environment, and performance of the upgraded application is monitored. If errors are detected in the upgraded application, the upgrade can be rolled back, and traffic can be rerouted back to the first host environment. If the errors are not detected, traffic can be increasingly routed to the second host environment and the first host environment can be deactivated.

17 Claims, 4 Drawing Sheets

(56) References Cited

U.S. PATENT DOCUMENTS

| | | | |
|---|---|---|---|
| 2006/0253848 | A1 | 11/2006 | Mathieu et al. |
| 2008/0028218 | A1 | 1/2008 | Simon |
| 2008/0098046 | A1 | 4/2008 | Alpern et al. |
| 2008/0276234 | A1 | 11/2008 | Taylor et al. |
| 2009/0217163 | A1 | 8/2009 | Jaroker |
| 2009/0265425 | A1 | 10/2009 | Lipscomb et al. |
| 2009/0300057 | A1 | 12/2009 | Friedman |
| 2009/0300151 | A1 | 12/2009 | Friedman et al. |
| 2010/0058319 | A1 | 3/2010 | Kawaguchi et al. |
| 2010/0088281 | A1 | 4/2010 | Driesen et al. |
| 2010/0185827 | A1 | 7/2010 | Lowery |
| 2010/0192143 | A1 | 7/2010 | Ingle et al. |
| 2010/0205594 | A1 | 8/2010 | Jirka |
| 2010/0223378 | A1* | 9/2010 | Wei ............................ 709/224 |
| 2010/0281456 | A1 | 11/2010 | Eizenman et al. |
| 2011/0004735 | A1 | 1/2011 | Arroyo et al. |
| 2011/0016461 | A1* | 1/2011 | Bankston et al. ............ 717/170 |
| 2011/0061046 | A1 | 3/2011 | Phillips |
| 2011/0126197 | A1 | 5/2011 | Larsen et al. |
| 2011/0161952 | A1 | 6/2011 | Poddar et al. |
| 2011/0296403 | A1 | 12/2011 | Janzen |
| 2012/0089972 | A1 | 4/2012 | Scheidel et al. |
| 2012/0304175 | A1 | 11/2012 | Darnola et al. |
| 2013/0036328 | A1 | 2/2013 | Mutisya et al. |
| 2013/0036402 | A1 | 2/2013 | Mutisya et al. |

OTHER PUBLICATIONS

"Introduction to Content Types", Retrieved at <<http://msdn.microsoft.com/en-us/library/ms472236.aspx>>, May 2010, pp. 3.
"List Template", Retrieved at <<http://msdn.microsoft.com/en-us/library/ms434306.aspx>>, May 2010, pp. 2.
"Site Types: WebTemplates and Site Definitions", Retrieved at http://msdn.microsoft.com/en-us/library/ms434313.aspx>>, May 2010, pp. 3.
"Using the Change Log", Retrieved at <<http://msdn.microsoft.com/en-us/library/bb447511.aspx>>, May 2010, pp. 2.
U.S. Notice of Allowance dated Jan. 2, 2014 in U.S. Appl. No. 13/197,794.
Meng, et al., "Improving the scalability of data center networks with traffic-aware virtual machine placement," Mar. 2010, In *INFOCOM, Proceedings IEEE*, pp. 1-9.
Munro, "Virtual Machines & VMware, Part I.", Dec. 21, 2001, Available at: http://atlas.binus.ac.id/PDC/EasWeb2.nsf/0/d6f02e9dba8b088247256bf7001f3bd3/$FILEIVirtual%20Machines%20VMware.pdf, 21 pp.
Patil et al., "Run-time dependency tracking in data centers," 2010, In *Proceedings of the Third Annual ACM Bangalore Conference (Compute '10) ACM*, New York, NY, USA, Article 5 , 6 pp.
Aguiar et al., "The application of distributed virtual machines for enterprise computer management: a two-tier network file system for image provisioning and management," 2008, *32nd Annual IEEE International*, pp. 428-431.
U.S. Official Action dated Apr. 2, 2013 in U.S. Appl. No. 13/198,728.

Anderson, Tim., "VS2010: Lifecycle Management", Retrieved at <<http://www.softwareknowhow.info/Buyers-Guide/VS2010:-Lifecycle-Management/82>>, Visual Studio 2010, Issue 47, Jan. 2, 2010, pp. 3.
"Great Tools, Great Testers, Great Software.", Retrieved at <<http://www.microsoft.com/india/msidc/servertools/vstb.aspx>>, Retrieved Date: Mar. 18, 2011, pp. 2.
Petri, Daniel., "Creating Differencing Disks with Microsoft Virtual PC", Retrieved at <<http://www.petri.co.il/virtual_creating_differencing_disks_with.htm>>, Jan. 8, 2009, pp. 5.
"Build and Deploy Continuously", Retrieved at <<http://msdn.microsoft.com/en-us/library/ee308011.aspx>>, Retrieved Date: Mar. 17, 2011, pp. 6.
"Electric Cloud Integrates with VMware Lab Manager to Deliver Virtualized Build and Test Automation", Retrieved at <<http://buildguru.com/news/2007-1107b.php>>, Nov. 7, 2007, pp. 2.
"Using Differencing Disks", Retrieved at <<http://technet.microsoft.com/en-us/library/cc720381%28WS.10%29.aspx>>, Retrieved Date: Mar. 21, 2011, pp. 4.
Graham-Cumming, John., "Software Builds and the Virtual Time Machine", Retrieved at <<http://drdobbs.com/architecture-and-design/205917147>>, Jan. 23, 2008, pp. 3.
Slawinska, et al., "Automated Deployment Support for Parallel Distributed Computing", Retrieved at <<http://ieeexplore.ieee.org/stamp/stamp.jsp?tp=&arnumber=4135271>>, Proceedings of the 15th Euromicro International Conference on Parallel, Distributed and Network-Based Processing, Feb. 7-9, 2007, pp. 5.
Hou, et al., "ADEM: Automating Deployment and Management of Application Software on the Open Science Grid", Retrieved at <<http://ieeexplore.ieee.org/stamp/stamp.jsp?tp=&arnumber=5353083>>, Proceedings of 10th IEEE/ACM International Conference on Grid Computing, Oct. 13-15, 2009, pp. 130-137.
Xiaoshe, et al., "Research on an Automatic Deployment Mechanism of Monitor Service in Grid Environment", Retrieved at <<http://ieeexplore.ieee.org/stamp/stamp.jsp?tp=&arnumber=4031531>>, Proceedings of the Fifth International Conference on Grid and Cooperative Computing Workshops, Oct. 2006, pp. 63-70.
Merle, et al., "Open Architecture for Building Large Scale Deployment systems", Retrieved at <<http://adele.imag.fr/Les.Publications/intConferences/SERP2004Mer.pdf>>, In Proceedings of Software Engineering Research and Practice, 2004, pp. 7.
Windows Workflow Foundation, Retrieved at <<http://msdn.microsoft.com/en-us/netframework/aa663328.aspx>>, Retrieved Date: Mar. 17, 2011, p. 1.
ExternalDataExchangeService Class, Retrieved at <<http://msdn.microsoft.com/en-us/library/system.workflow.activities.externaldataexchangeservice.aspx>>, Retrieved Date: Mar. 17, 2011, pp. 5.
U.S. Notice of Allowance dated Jul. 31, 2013 in U.S. Appl. No. 13/198,728.
U.S. Official Action dated Aug. 14, 2013 in U.S. Appl. No. 13/197,794.
U.S. Official Action dated Jun. 20, 2014 in U.S. Appl. No. 13/198,728.

* cited by examiner

CONTINUOUS DEPLOYMENT OF APPLICATIONS

BACKGROUND

In some computing environments, services and applications are hosted by servers or server farms. For example, some customer relationship management ("CRM") applications, personal information management ("PIM") applications, and/or collaboration applications may be hosted by web-based and/or network-accessible applications hosted by one or more servers in addition to, or instead of, being executed by a personal computer or other user device.

By hosting applications on servers, application developers can distribute and apply updates, patches, and other application refinements more frequently than is possible for software sold or distributed to users for installation at user at devices. For example, incremental changes that otherwise may not justify an application upgrade may nonetheless be applied to an application hosted by a server, as mailing or shipping upgrade disks or other media is not required to effect the upgrade. Thus, the pace at which applications are upgraded and rolled out to consumers can be increased.

One challenge in updating hosted applications, however, is that such upgrades can be expensive and time consuming to perform or implement. Furthermore, if errors are experienced in the upgraded application, the application may be unusable for all users. Rolling back upgrades in the event of errors or other issues can be difficult in some circumstances, and may require taking the application offline. Thus, errors or other performance issues experienced in a hosted application upgrade can be expensive to repair and/or can seriously affect the user experience with the application.

It is with respect to these and other considerations that the disclosure made herein is presented.

SUMMARY

Concepts and technologies are described herein for continuous deployment of applications. In accordance with the concepts and technologies disclosed herein, a deployment service manages two or more host environments such as server computers or server farms. When an application upgrade is determined to be available, the deployment service manages rollout and installation of the application, synchronizing of the content between one host environment hosting a previous version of the application and an upgrade host environment hosting an upgraded version of the application, monitoring of performance of the upgraded version of the application, rollback of the upgrade, if needed, and load balancing between the two or more host environments during monitoring of the upgraded version of the application.

According to one aspect, when an upgrade is determined to be available, the deployment service issues a command to one or more host environments to prepare a backup of a base host environment that hosts the application for which an upgrade is available. The backup can contain data corresponding to content used or hosted by the host environment and/or data corresponding to the application hosted by the host environment. The backup is passed to another host environment, referred to herein as an upgrade host environment. The upgrade host environment loads or restores the backup such that the upgrade host environment hosts an application and content substantially identical to the base host environment.

When rolling out the upgrade, the upgrade host environment is upgraded to the new version of the application. The upgrade host environment issues requests to the base host environment for any changes to the content that have occurred subsequent to the creation of the backup. Changes from the base host environment are synchronized to the upgrade host environment to ensure that the content hosted by the base host environment and the upgrade environment remain consistent with one another. This approach can be used to allow users to continue accessing the base application environment and/or to allow users to access both the base host environment and the upgrade host environment from the time the upgrade process is begun until the upgrade process is completed.

The upgrade host environment also is configured to notify a load balancer when the upgrade process is complete and/or when all changes between the base host environment and the upgrade host environment are synchronized. The load balancer is configured to begin directing traffic to both host environments and to monitor performance of the upgrade host environment to determine if the upgraded application functions properly. Content changes can be synchronized between the host environments until one of the host environments is taken offline after successful monitoring. During the period of time that both host environments are online, the load balancer can determine if a user or device has previously accessed one of the host environments and if so, route the user or device to the same host environment. Thus, the user or device can interact with the same version of the application with each access to ensure a consistent user experience.

According to yet another aspect, the monitor is configured to determine if errors are detected in operation of the upgrade host environment. If errors are detected, the monitor can order the upgrade host environment to rollback or uninstall the upgrade. In some embodiments, traffic is rerouted from the upgrade host environment back to the base host environment. The upgrade host environment can be taken offline until a new upgrade is rolled out. Thus, functionality associated with the application can be maintained during rollout of the upgrade and during rollback of the upgrade.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 is a computer architecture diagram illustrating an exemplary computer hardware and software architecture for a

DETAILED DESCRIPTION

Figure 1:
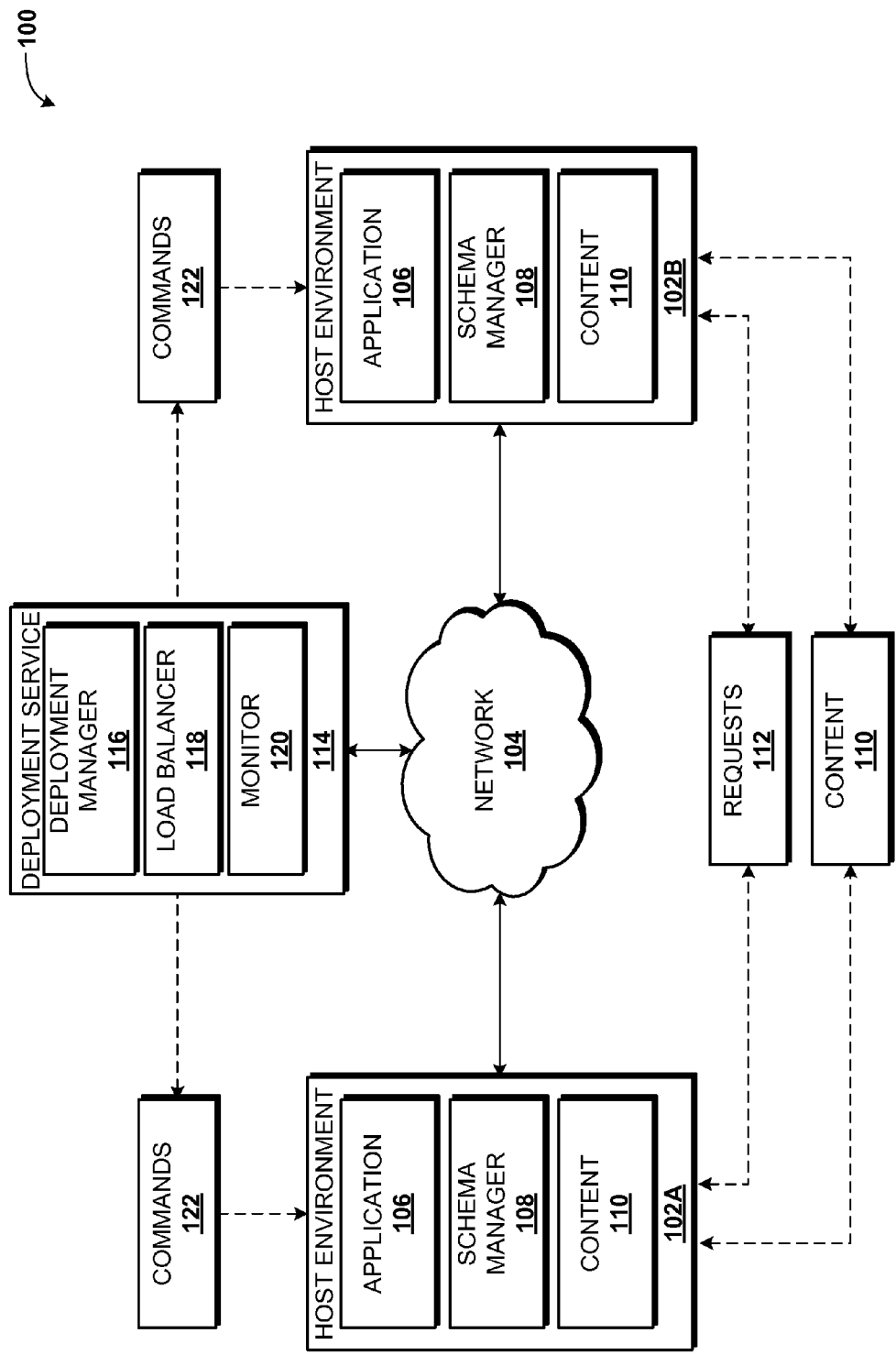
FIG. 1 is a system diagram illustrating an exemplary operating environment for the various embodiments disclosed herein.

The following detailed description is directed to concepts and technologies for continuous deployment of applications. According to the concepts and technologies described herein, a deployment service manages two or more host environments such as server computers or server farms. When an application upgrade is determined to be available, the deployment service manages rollout and installation of the application, synchronizing of the content between a first host environment hosting a base version of the application and a second host environment hosting an upgraded version of the application, monitoring of performance of the upgraded version of the application, rollback of the upgrade, if needed, and load balancing between the two or more host environments during monitoring of the upgraded version of the application. If the upgraded version of the application includes errors, the upgrade can be rolled back, traffic can be rerouted back to the first host environment from the second host environment, and the second host environment can be deactivated. If the upgraded version of the application performs without errors, or without errors in excess of a defined error threshold, the upgrade can be maintained, traffic can be increasingly routed to the second host environment, and the first host environment can eventually be deactivated.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for continuous deployment of applications will be presented.

Referring now to FIG. 1, aspects of one operating environment 100 for the various embodiments presented herein will be described. The operating environment 100 shown in FIG. 1 includes one or more host environments 102A-B (hereinafter collectively or generically referred to as the host environments 102). The host environments 102 are configured to operate on or in communication with a network 104. In some embodiments, each of the host environments corresponds to a server computer or a server farm configured to provide a web- or network-based application environment for accessing and using functionality associated with an application 106. In some embodiments, each of the host environments 102 is configured to provide functionality associated with the application 106, wherein the application 106 provides functionality associated with an online collaboration application. For example, in some embodiments, the application 106 executed by one or more of the host environments 102 corresponds to a member of the SHAREPOINT family of collaboration products available from MICROSOFT CORPORATION in Redmond, Wash. Because the host environments 102 can be configured to host any desired application 106 or other functionality, it should be understood that this embodiment is illustrative, and should not be construed as being limiting in any way.

The host environments 102 also are configured to execute or otherwise provide functionality associated with a schema manager 108. The schema manager 108 is configured to manage content 110 hosted or stored by the host environments 102. The content 110 corresponds to information used by the application 106 in providing the functionality associated with the application 106 to one or more users. It can be understood that the content 110 can vary depending upon which version of the application 106 is being executed by the host environment. Thus, for example, the content 110 used or consumed by one version of the application 106 may be inconsistent with the content 110 used or consumed by another version of the application 106.

As will be appreciated herein, two or more versions of the applications 106 can be simultaneously executed by the two or more host environments 102 in accordance with the concepts and technologies disclosed herein. Thus, the schema manager 108 is configured, in some embodiments, to ensure that versions of the content 110 used or consumed by the various versions of the application 106 are consistent with, or at least can be mapped to, one another. Thus, the schema manager 108 can be used to ensure that the versions of content 110 can be synchronized to one another by the host environments 102, even if running different versions of the application 106.

In particular, as will be explained in more detail herein, particularly with reference to FIGS. 2-3, the host environments 102 are configured in some embodiments to exchange or synchronize versions of the content 110 stored or hosted by the host environments 102 during and subsequent to an upgrade process as described herein. In some embodiments, the host environments 102 exchange requests 112 for the content 110, and in response to the requests 112, the host environments 102 exchange the requested content 110. The requests 112 can identify requested data.

In some embodiments, as will be explained in more detail below, the schema manager 108 uses a custom schema to modify and/or reference the data stored as the content 110. In one embodiment, the schema manager 108 adds a custom field to data stored as the content 110. This custom field, referred to herein as a "tombstone list," can provide a handle or custom key for referencing data records associated with the content 110. As mentioned above, the concepts and technologies disclosed herein support updating various versions of the content 110 during and subsequent to the upgrade process when users may be accessing more than one version of the application 106 and thereby performing operations on more than one version of the content 110. Thus, a user may, for example, delete a record in one version of the content 110. Synchronizing a deleted record to another host environment 102, however, may not be possible in some implementations. In particular, in some embodiments, each record in the content 110 includes a unique ID. The content 110 hosted by another host environment 102, however, may not automatically be assigned the same unique ID. Thus, if a particular record is deleted in one host environment, the referencing the same record in the other host environment 102 may be impossible.

Some embodiments of the concepts and technologies disclosed herein use the above-mentioned tombstone list to address these and other situations. The custom field is used to store a unique data entry for each record, and this custom field is replicated with the content 110 when the content 110 is restored or loaded to the host environment 102 that is to host the upgraded application 106. Thus, when a record is deleted in one host environment 102, the now-deleted record may be identified in the other host environment 102, even if the unique ID associated with the deleted record is not consistent in both environments. The tombstone list can be used for other purposes, if desired.

According to various implementations, the operating environment 100 also includes a deployment service 114. The functionality of the deployment service 114 can be provided by one or more server computers or other computing devices configured to provide the functionality described herein. In various implementations, the deployment service 114 is configured to execute a deployment manager 116, a load balancer 118, a monitor 120, and/or other application programs or modules. Although the deployment manager 116, the load balancer 118, and the monitor 120 are illustrated as components of the deployment service 114, it should be understood that each of these components, or combinations thereof, may be embodied as or in stand-alone devices or components thereof operating on or in communication with the network 104, the deployment service 114, and/or one or more of the host environments 102. Thus, the illustrated embodiment is exemplary, and should not be construed as being limiting in any way.

The deployment manager 116 is configured to manage and/or control the deployment processes described herein for upgrading the applications 106 and/or for rolling back upgrades for the applications 106. The deployment manager 116 is configured to receive an indication, or to determine, that an upgrade for the application 106 is available and to initiate the upgrade process. According to various implementations, the deployment manager 116 is configured to issue one or more commands 120 for initiating, controlling, and/or terminating an upgrade process or a rollback process for rolling back an application upgrade.

The deployment manager 116 also is configured to issue and receive commands to and from the load balancer 118 and/or the monitor 120 to obtain monitoring information and/or to control load balancing functions of the deployment service 114, as will be explained herein with reference to FIGS. 2-3. Because the commands for initiating, controlling, and/or terminating the upgrade process or rollback process can be generated by additional or alternative entities, it should be understood that the deployment manager 116 is optional. Thus, the illustrated embodiment should not be construed as being limiting in any way.

The load balancer 118 is configured to control routing of traffic to the host environments 102. During an upgrade or rollback process, the load balancer 118 routes the traffic to one or more of the host environments 102. After an upgrade process, for example, the load balancer 118 can route some traffic to the host environment hosting an upgraded version of the application 106 for testing. If errors are detected in operation of the upgraded version of the application 106, the load balancer 118 may be commanded to reroute traffic back to the host environment 102 hosting the base version of the application 106 so the rollback process can execute. As will be explained in more detail herein, the load balancer can be configured to balance or route traffic to the host environments 102 based upon hash values of userIDs or other strings or identifiers. These and other embodiments will be described herein, particularly with reference to FIG. 3.

The monitor 120 is configured to monitor performance of the host environment 102 hosting the upgraded version of the application 106. Thus, the monitor 120 can be used to determine if the upgraded version of the application 106 functions correctly prior to taking the base version of the application 106 offline. In some embodiments, a rollback process can be initiated if the monitor 120 determines that the upgraded version of the application 106 is not performing correctly. Thus, the monitor 120 can be used to ensure that the upgrade process has successfully executed, prior to completing the process by taking the base version of the application 106 offline.

FIG. 1 illustrates two host environments 102, one network 104, and one deployment service 114. It should be understood, however, that some implementations of the operating environment 100 include more than two host environments 102, multiple networks 104, and/or multiple deployment services 114. Thus, the illustrated embodiments should be understood as being exemplary, and should not be construed as being limiting in any way.

Figure 2:
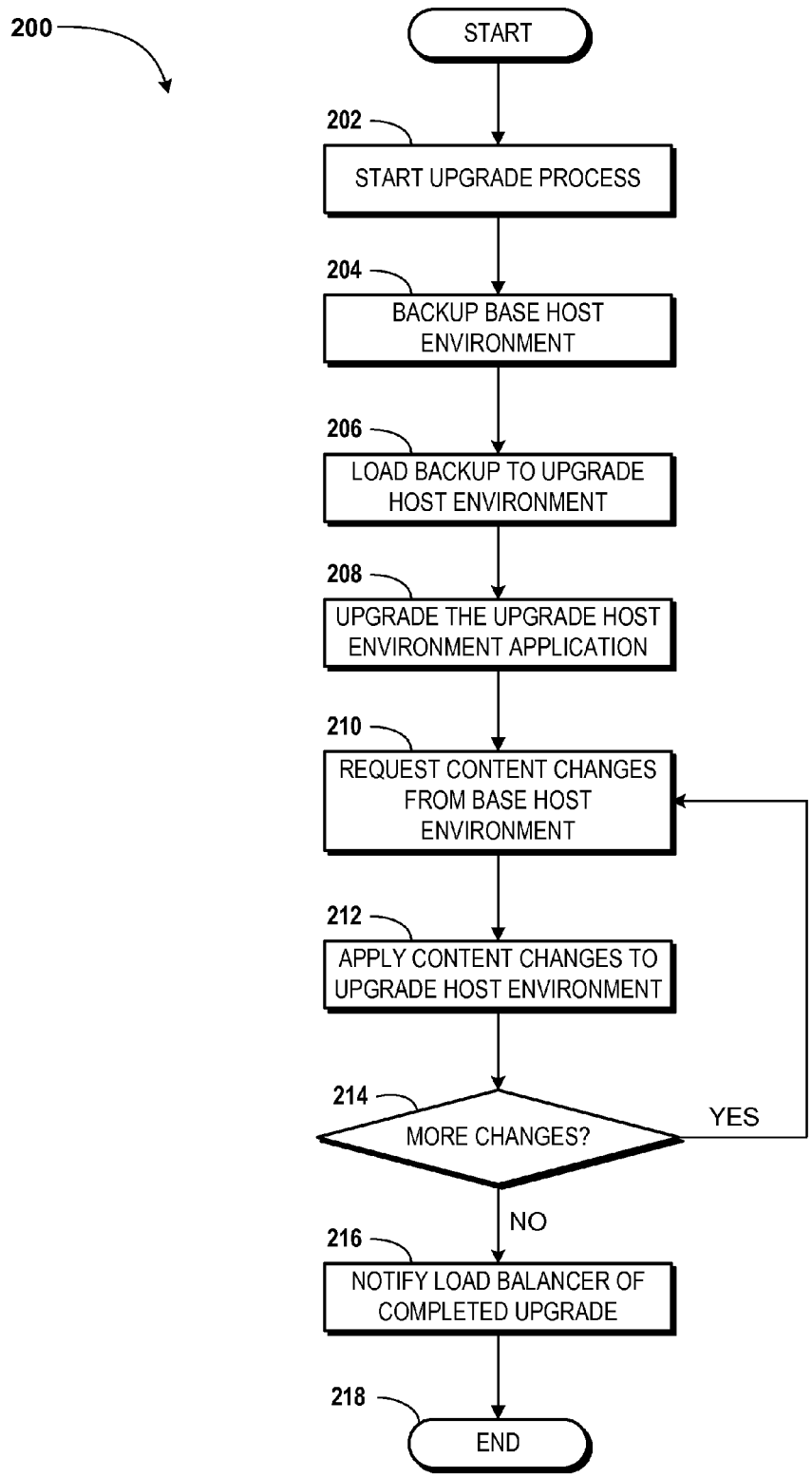
FIG. 2 is a flow diagram showing aspects of a method for deploying an application, according to an exemplary embodiment.

Turning now to FIG. 2, aspects of a method 200 for deploying an application 106 will be described in detail. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined above. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts and technologies disclosed herein, the method 200 is described as being performed by the host environments 102. As explained above, however, the host environments 102 can receive commands 122 from other entities such as the deployment service 114. Additionally, or alternatively, the deployment service 114 or other entities can control various aspects of the upgrade process. As such, it should be understood that the described embodiments are exemplary, and should not be viewed as being limiting in any way.

The method 200 begins at operation 202, wherein the upgrade process is begun. As noted above, the upgrade process can be initiated by receiving a command 122 from the deployment service 114, which can be notified or can determine that an upgrade is available for the application 106. In some embodiments, application upgrades are initiated according to one or more upgrade schedules. Thus, the host environments 102 can initiate an upgrade based upon the schedule with or without any involvement from the deployment service 114. While the method 200 is described with respect to an upgrade process, it should be understood that the concepts and technologies disclosed herein also support upgrade rollback processes, which can be completed in a manner substantially similar to the embodiments described herein for updating the application 106. For purposes of simplifying the description herein of the upgrade process, the host environment 102 hosting the base version of the application 106 is referred to herein as the "base host environment 102A," and the host environment 102 hosting or being upgraded to the upgraded version of the application 106 is referred to herein as the "upgrade host environment 102B." It should be understood that this embodiment is illustrative, and should not be construed as being limiting in any way.

From operation 202, the method 200 proceeds to operation 204, wherein a backup of the base host environment 102A is created. According to various implementations, the backup created in operation 202 includes data corresponding to the content 110 hosted at the base host environment 102A. The backup also can include data corresponding to the application 106 hosted by the base host environment 102A. As such, the backup can be restored to another host environment 102 to create a copy of the base host environment 102A.

From operation 204, the method 200 proceeds to operation 206, wherein the backup created in operation 202 is loaded or restored to the upgrade host environment 102B. The upgrade host environment 102B can obtain the backup in response to determining or receiving a command 122 to initiate the upgrade process. It should be appreciated that the upgrade host environment 102B can receive the backup from the base host environment 102A and/or can access the base host environment 102A to obtain the backup.

From operation 206, the method 200 proceeds to operation 208, wherein the application 106 hosted by the upgrade host environment 102B is upgraded to a new version of the application 106. As noted above, the application 106 hosted by the upgrade host environment 102B can be substantially identical to the application 106 hosted by the base host environment 102A when first installed. Thus, the application 106 hosted by the upgrade host environment 102B is upgraded to an upgraded version of the application 106. In some embodiments, the host environment 102B corresponds to a server farm, and the server computers hosting the application 106 can be incrementally updated to the new version of the application 106. Thus, the upgrade can be incrementally rolled out to the upgrade host environment 102B, if desired, to mitigate risks associated with upgrading the application 106.

From operation 208, the method 200 proceeds to operation 210, wherein the upgrade host environment 102B requests changes to the content 110 from the base host environment 102A. In some embodiments, the upgrade host environment 102B passes the requests 112 to the base host environment 102A to obtain the changes, while in other embodiments, the base host environment 102A is configured to push changes to the content 110 to the upgrade host environment as part of the upgrade process. As can be appreciated from the description herein, the base host environment 102A and the upgrade host environment 102B can simultaneously be in use during the upgrade process. Thus, embodiments of the concepts and technologies disclosed herein include pushing or pulling updates to the content 110 from both host environments 102 to ensure that both host environments host an up-to-date version of the content 110. By maintaining an up-to-date copy of the content 110, either of the host environments 102 can be taken offline at any time without affecting the content 110.

From operation 210, the method 200 proceeds to operation 212, wherein the upgrade host environment 102B applies changes received from the base host environment 102 in response to the requests 110 generated in operation 210. Thus, both versions of the content 110 can be kept synchronized to ensure that either version of the application 106 can be used and/or to ensure that users accessing both host environments 102 interact with similar or identical versions of the content 110.

As illustrated at operation 214, the content 110 can be synchronized between the host environments until one or more of the host environments 102 is taken offline. Thus, operation 214 illustrated determining if more changes to the content 110 are to be synchronized between the host environments 102. If more changes are to be synchronized, operations 210-212 are repeated. Operations 210-214 are repeated until only one version of the content 110 is maintained and/or until only one host environment 102 is used to provide functionality associated with the application 106.

If determined in operation 214 that no more changes remain for synchronization, the method 200 proceeds to operation 216, wherein the load balancer 118 is notified that upgrading of the application 106 has completed. The load balancer 118 is configured to route traffic to none, either, or both of the host environments 102. In some embodiments, the load balancer 118 is configured to route some traffic to the upgrade host environment 102B so that performance of the upgrade host environment 102B can be monitored by the monitor 120 to determine if the upgrade host environment 102B functions without errors. Some embodiments for balancing traffic between the host environments 102 are described below with reference to FIG. 3. From operation 216, the method 200 proceeds to operation 218. The method 200 ends at operation 218.

Figure 3:
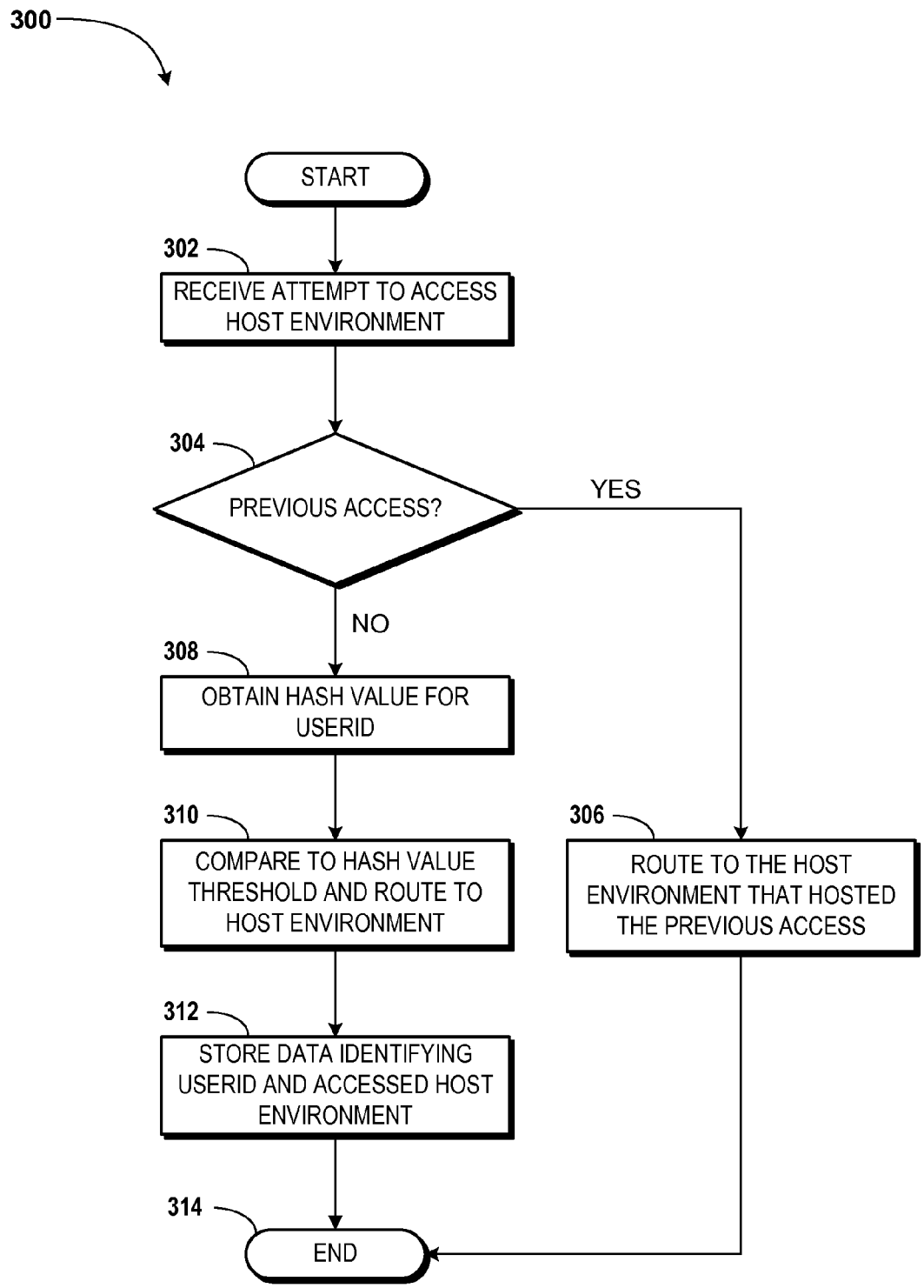
FIG. 3 is a flow diagram showing aspects of a method for load balancing traffic between host environments, according to an exemplary embodiment.

Turning now to FIG. 3, aspects of a method 300 for load balancing traffic between host environments 102 hosting one or more versions of the application 106 will be described in detail. For purposes of illustrating and describing the concepts and technologies disclosed herein, the method 300 is described as being performed by the load balancer 118. It should be understood that these embodiments are exemplary, and should not be viewed as being limiting in any way.

The method 300 begins at operation 302, wherein an attempt to access one of the host environments 102 is received. From the above description, it can be appreciated that a request to access one of the host environments 102 can correspond to a request to access the functionality associated with the application 106. Thus, a user may attempt to access the application 106 and the load balancer 118 can determine that the requested application 106 is hosted by two or more host environments 102. For example, the load balancer 118 can determine that an upgrade process is underway, and that traffic is being routed to two or more host environments 102 as described herein. In some embodiments, the deployment service 114 routes application access requests through the load balancer 118. In other embodiments, the load balancer 118 is called when access requests are received by the host environments 102. It should be understood that these embodiments are illustrative, and should not be construed as being limiting in any way.

From operation 302, the method 300 proceeds to operation 304, wherein the load balancer 118 determines if the user or device associated with the access request has previously accessed one or more of the host environments 102. In some embodiments, the load balancer 118 determines if the user or device has accessed the upgrade host environment 102B, as access to the base application environment 102A may be irrelevant to the load balancer 118. In some embodiments, the load balancer 118 is configured to determine if the user or device has accessed the one or more host environments 102 based, at least partially, upon a userID or other identifier associated with the user or device.

In some implementations, for example, a userID or other identifier associated with a user or device can be obtained by the load balancer 118 via communications with one or more of the host environments 102 with which the user or device authenticates. In other embodiments, the load balancer 118 or another entity can prompt the user or device for the userID or other identifier when the access request is received by the load balancer 118. In yet other embodiments, cookies or other data can be used to track users or devices if a user or device "opts-in" to such functionality. Other approaches for determining if the user or device has previously accessed the host environments 102 are possible and contemplated, but will not be described in additional detail herein. In some embodiments, if the previous access determined to have occurred in operation 304 occurred prior to upgrading a version of the application 106 hosted by one of the host environments 102, or when only the base host environment 102A was active, the load balancer 118 can treat the access request as if no previous access has occurred.

If the load balancer 118 determines in operation 304 that the user or device has previously accessed one or more of the host environments 102, the method 300 proceeds to operation 306. In operation 306, the load balancer 118 routes the traffic associated with the access request to the host environment 102 that hosted the previous access associated with the user or device. Thus, the load balancer 118 can route the user or device to the same version of the application 106 previously used by the user or device to ensure that the user or device is provided with a consistent user experience until the upgrade process of the application 106 is completed.

If the load balancer 118 determines, in operation 304, that the user or device has not previously accessed one or more of the host environments 102, or if the user or device previously accessed the host environment 102 before the upgrade process was initiated, the method 300 proceeds to operation 308. In operation 308 the load balancer 118 obtains a hash value for the userID or other identifier associated with the access request received in operation 302. The load balancer 118 can use any suitable hash algorithm or other process for obtaining the hash value obtained in operation 308. Furthermore, other methods of assigning values corresponding to the userID or other identifiers, or otherwise anonymizing the userID or other identifiers, can be used without departing from the scope of the concepts and technologies disclosed herein. Thus, the embodiments described herein for using hash values are illustrative, and should not be construed as being limited in any way.

From operation 308, the method 300 proceeds to operation 310, wherein the load balancer 118 compares the hash value obtained in operation 308 to a hash value threshold. Based upon the comparison of the calculated hash value to the hash value threshold, the load balancer 118 routes the traffic associated with the access request.

As noted above, use of hash values and hash value thresholds are illustrative embodiments of the concepts and technologies disclosed herein, and therefore should not be construed as being limited in any way. The hash value threshold can be set according to any desired considerations. For example, a range of possible hash values can be determined, and the hash value threshold can be set such that about 50% of calculated hash values will exceed the hash value threshold and about 50% of the calculated hash values will be less than or equal to the hash value threshold.

The hash value threshold also can be a dynamically set threshold. For example, the hash value threshold can be set to a first value at a first time such that less traffic is routed to the upgrade host environment 102B. If the upgrade host environment 102B experiences no errors, the hash value threshold can be adjusted such that an increasingly greater share of traffic is routed to the upgrade host environment. As noted above, if the upgrade host environment 102B experiences few or no errors, the base host environment 102A can be taken offline. Thus, the hash value threshold can be gradually increased, if desired, until 100% of the access requests are routed to the upgrade host environment 102B. It should be understood that this embodiment is illustrative, and should not be construed as being limiting in any way.

From operation 310, the method 300 proceeds to operation 312, wherein the load balancer 118 stores data associating the userID with the host environment 102 accessed by the device associated with the userID. Thus, if the user or device associated with the userID or other identifier again attempts to access the host environments 102, the user or device can be routed to the same host environment 102 to which the user or device was routed in operation 310. From operation 312, the method 300 proceeds to operation 314. The method 300 ends at operation 314.

Figure 4:
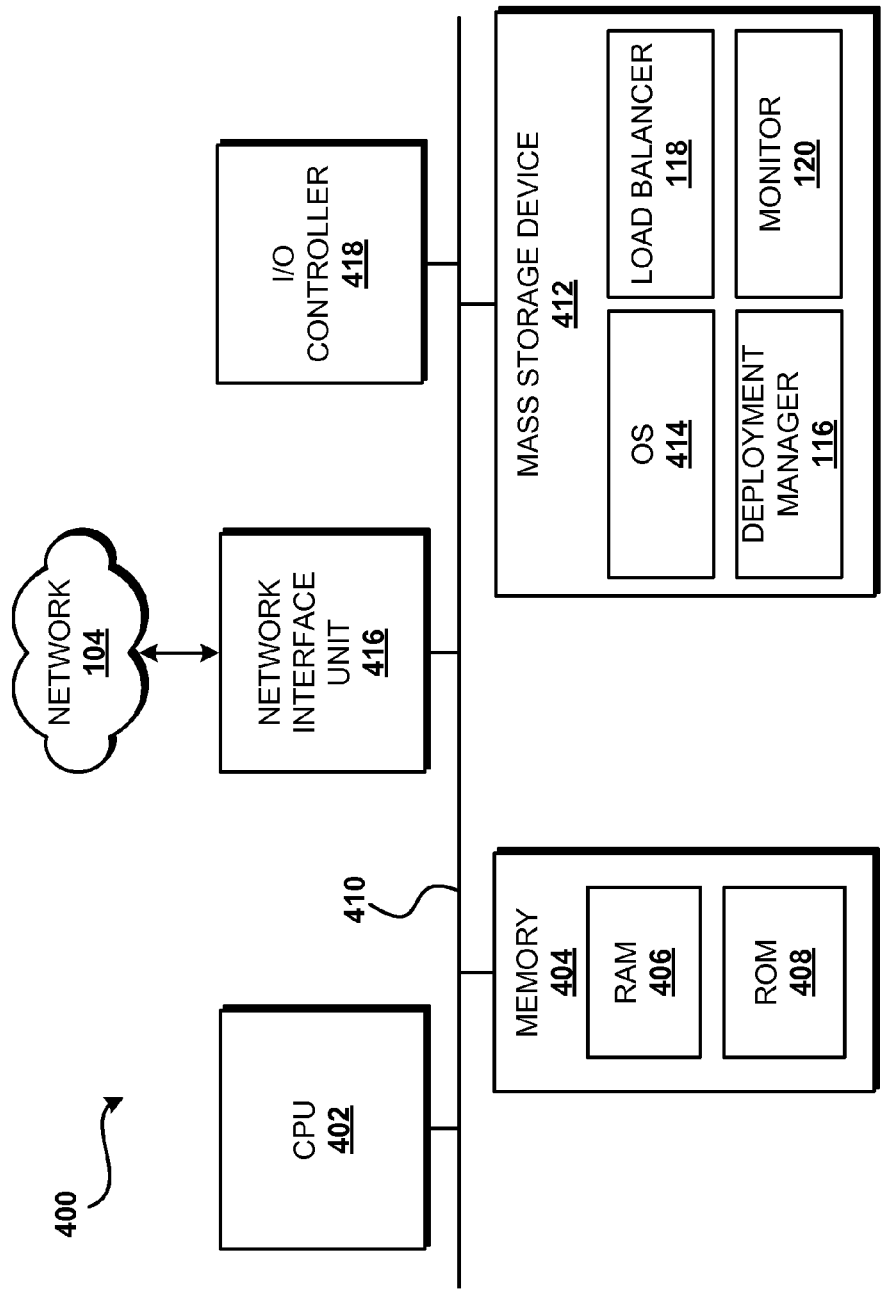

FIG. 4 illustrates an exemplary computer architecture 400 for a device capable of executing the software components described herein for continuously deploying applications 106, providing load balancing for deployed applications 106, and for monitoring applications 106. Thus, the computer architecture 400 illustrated in FIG. 4 illustrates an architecture for a server computer, a desktop computer, a netbook computer, a tablet computer, a laptop computer, and/or other computing devices, any of which can provide the functionality of the deployment service 114 and/or one or more of the host environments 102 as described herein. Thus, the computer architecture 400 may be utilized to execute any aspects of the software components presented herein.

The computer architecture 400 illustrated in FIG. 4 includes a central processing unit 402 ("CPU"), a system memory 404, including a random access memory 406 ("RAM") and a read-only memory ("ROM") 408, and a system bus 410 that couples the memory 404 to the CPU 402. A basic input/output system containing the basic routines that help to transfer information between elements within the computer architecture 400, such as during startup, is stored in the ROM 408. The computer architecture 400 further includes a mass storage device 412 for storing the operating system 414, the deployment manager 116, the load balancer 118, and the monitor 120. Although not shown in FIG. 4, the mass storage device 412 also can be configured to store the applications 106, the schema manager 108, and/or the content 110, if desired.

The mass storage device 412 is connected to the CPU 402 through a mass storage controller (not shown) connected to the bus 410. The mass storage device 412 and its associated computer-readable media provide non-volatile storage for the computer architecture 400. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 400. For purposes the claims, the phrase "computer storage medium" and variations thereof, does not include waves, signals, and/or other transitory and/or intangible communication media, per se.

According to various embodiments, the computer architecture 400 may operate in a networked environment using logical connections to remote computers through a network such as the network 104. The computer architecture 400 may connect to the network 104 through a network interface unit 416 connected to the bus 410. It should be appreciated that the network interface unit 416 also may be utilized to connect to other types of networks and remote computer systems. The computer architecture 400 also may include an input/output controller 418 for receiving and processing input from a number of other devices, including a keyboard, mouse, or electronic stylus (not shown in FIG. 4). Similarly, the input/output controller 418 may provide output to a display screen, a printer, or other type of output device (also not shown in FIG. 4).

It should be appreciated that the software components described herein may, when loaded into the CPU 402 and executed, transform the CPU 402 and the overall computer architecture 400 from a general-purpose computing system into a special-purpose computing system customized to facilitate the functionality presented herein. The CPU 402 may be constructed from any number of transistors or other discrete circuit elements, which may individually or collectively assume any number of states. More specifically, the CPU 402 may operate as a finite-state machine, in response to executable instructions contained within the software modules disclosed herein. These computer-executable instructions may transform the CPU 402 by specifying how the CPU 402 transitions between states, thereby transforming the transistors or other discrete hardware elements constituting the CPU 402.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 400 in order to store and execute the software components presented herein. It also should be appreciated that the computer architecture 400 may include other types of computing devices, including hand-held computers, embedded computer systems, personal digital assistants, and other types of computing devices known to those skilled in the art. It is also contemplated that the computer architecture 400 may not include all of the components shown in FIG. 4, may include other components that are not explicitly shown in FIG. 4, or may utilize an architecture completely different than that shown in FIG. 4.

Based on the foregoing, it should be appreciated that technologies for continuous deployment of applications have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for deploying an application, the computer-implemented method comprising performing computer-implemented operations for:
   requesting creation of a backup comprising data representing a base version of the application executed by a first host environment and content hosted by the first host environment;
   obtaining the backup at a second host environment;
   loading the backup at the second host environment;
   upgrading the application hosted by the second host environment to obtain an upgraded version of the application;
   generating at the second host environment, a request for data indicating a content change that has occurred at the first host environment after creation of the backup;
   obtaining the data indicating the content change at the second host environment; and
   modifying content hosted by the second host environment in accordance with the data indicating the content change, wherein the data indicating the content change comprises a tombstone list, and wherein the tombstone list comprises a custom field for storing a unique identifier corresponding to a data record deleted via the content change.

2. The method of claim 1, further comprising:
   determining if a further content change has occurred at the first host environment; and
   in response to determining that the further content change has occurred, generating, at the second host environment, a request for data indicating the further content change.

3. The method of claim 1, wherein the first host environment comprises a server farm.

4. The method of claim 3, wherein the application comprises a collaboration program.

5. The method of claim 2, further comprising:
   in response to determining that the further content change has not occurred, notifying a load balancer to begin routing traffic for the first host environment to the second host environment.

6. The method of claim 5, further comprising:
   receiving an access request to use functionality associated with the application; and
   routing traffic associated with the access request to one of the first host environment or the second host environment.

7. The method of claim 6, wherein routing the traffic comprises:
   in response to determining that a user associated with the access request has previously accessed one or more of the first host environment and the second host environment, routing the traffic associated with the user to the previously accessed host environment; and
   in response to determining that a user associated with the access request has not previously accessed one or more of the host environments,
      obtaining a hash value corresponding to an identifier associated with the user,
      comparing the hash value to a hash value threshold,
      routing the traffic to the first host environment or the second host environment based, at least partially, upon the comparison.

8. The method of claim 7, wherein the hash value threshold comprises a dynamic value.

9. The method of claim 1, further comprising:
   monitoring performance of the upgraded version of the application;
   in response to identifying an error in the upgraded version of the application, routing the traffic from the second host environment to the first host environment; and
   rolling back the upgrade to the application.

10. A computer-implemented method for deploying an application, the computer-implemented method comprising performing computer-implemented operations for:
    creating, at a first host environment, a backup comprising data representing a base version of the application executed by the first host environment and content hosted by the first host environment;
    obtaining the backup at a second host environment;
    loading the backup at the second host environment to install the base version of the application at the second host environment and to create a copy of the content at the second host environment;
    upgrading the base version of the application hosted by the second host environment to obtain an upgraded version of the application;
    generating, at the second host environment, a request for data indicating a content change that has occurred at the first host environment after creation of the backup;
    obtaining the data indicating the content change at the second host environment; and
    modifying content hosted by the second host environment in accordance with the data indicating the content change, wherein the data indicating the content change comprises a tombstone list. and wherein e tombstone list con irises a custom field for storming a unique identifier corresponding to a data record deleted via the content change.

11. The method of claim 10, further comprising:
    determining if a further content change has occurred at the first host environment;
    in response to determining that the further content change has occurred, generating, at the second host environment, a request for data indicating the further content change; and
    in response to determining that the further content change has not occurred, notifying a load balancer to begin routing traffic for the first host environment to the second host environment.

12. The method of claim 11, further comprising monitoring performance of the upgraded version of the application.

13. The method of claim 12, further comprising:
    in response to identifying errors in the upgraded version of the application, routing the traffic from the second host environment to the first host environment; and
    rolling back the upgrade to the application.

14. The method of claim 13, wherein rolling back the upgrade comprises deactivating the second host environment.

15. A computer storage medium having computer readable instructions stored thereupon that, when executed by a computer, cause the computer to:
    create a backup of a first host environment, the backup comprising data representing a base version of an application executed by the first host environment and content hosted by the first host environment;
    load the backup to a second host environment to install the base version of the application at the second host environment and to create a copy of the content at the second host environment;
    upgrade the base version of the application hosted by the second host environment to obtain an upgraded version of the application;

generate, the second host environment, a request for data indicating a content change that has occurred at the first host environment after creation of the backup;
obtain the data indicating the content change at the second host environment; and
modify content hosted by the second host environment in accordance with the data indicating the content change to synchronize the content hosted at the first host environment and the content stored at the second host environment, wherein the data indicating the content change comprises a tombstone list. and wherein the tombstone list comprises a custom field for storing a unique identifier corresponding, to a data record deleted via the content change.

16. The computer storage medium of claim 15, further comprising computer-executable instructions that, when executed by the computer, cause the computer to:
determine if further content changes have occurred at the first host environment;
in response to determining that the further content changes have occurred, generate, at the second host environment, requests for data indicating the further content changes;
in response to determining that the further content changes have not occurred,
notify a load balancer to begin routing traffic for the first host environment to the second host environment, and
monitor performance of the upgraded version of the application.

17. The computer storage medium of claim 16, further comprising computer-executable instructions that, when executed by the computer, cause the computer to:
in response to identifying one or more errors in the upgraded version of the application, routing the traffic from the second host environment to the first host environment; and
deactivating the second host environment.

* * * * *